US010638548B2

(12) United States Patent
Kagaya

(10) Patent No.: US 10,638,548 B2
(45) Date of Patent: Apr. 28, 2020

(54) WINDOW GLASS FOR VEHICLE

(71) Applicant: AGC INC., Tokyo (JP)

(72) Inventor: Osamu Kagaya, Tokyo (JP)

(73) Assignee: AGC INC., Tokyo (JP)

( * ) Notice: Subject to any disclaimer, the term of this patent is extended or adjusted under 35 U.S.C. 154(b) by 181 days.

(21) Appl. No.: 15/592,105

(22) Filed: May 10, 2017

(65) Prior Publication Data

US 2017/0347404 A1  Nov. 30, 2017

(30) Foreign Application Priority Data

May 24, 2016 (JP) ................ 2016-103690

(51) Int. Cl.
| | | |
|---|---|---|
| H05B 3/84 | (2006.01) | |
| H01Q 1/12 | (2006.01) | |
| H01Q 1/46 | (2006.01) | |
| B60J 1/20 | (2006.01) | |
| H05B 3/03 | (2006.01) | |

(52) U.S. Cl.
CPC ............. H05B 3/84 (2013.01); B60J 1/20 (2013.01); H01Q 1/1278 (2013.01); H01Q 1/1285 (2013.01); H01Q 1/46 (2013.01); H05B 3/03 (2013.01); *H05B 2203/008* (2013.01); *H05B 2203/031* (2013.01)

(58) Field of Classification Search
CPC ...... H01Q 1/1278; H01Q 1/1285; H01Q 1/46; H05B 2203/008; H05B 2203/031; H05B 3/03; H05B 3/84; H05B 3/86
USPC .................. 219/203, 520–522, 542, 543
See application file for complete search history.

(56) References Cited

U.S. PATENT DOCUMENTS

| | | | | |
|---|---|---|---|---|
| 4,021,813 A | * | 5/1977 | Black ............... | H01Q 3/242 343/768 |
| 4,703,328 A | * | 10/1987 | Jones ............... | H01Q 1/1278 219/203 |
| 5,177,495 A | * | 1/1993 | Davies ............. | H01Q 1/1278 343/704 |
| 5,198,826 A | * | 3/1993 | Ito ................... | H01Q 1/38 343/713 |
| 5,266,960 A | * | 11/1993 | Lindenmeier ..... | H01Q 1/1271 343/704 |
| 5,307,076 A | * | 4/1994 | Murakami ........ | B32B 17/10036 343/704 |
| 5,324,374 A | * | 6/1994 | Harmand .......... | B32B 17/10036 156/100 |

(Continued)

FOREIGN PATENT DOCUMENTS

| | | |
|---|---|---|
| EP | 0 542 473 A1 | 5/1993 |
| JP | H05-043608 U | 6/1993 |

(Continued)

*Primary Examiner* — Seth W. MacKay-Smith
(74) *Attorney, Agent, or Firm* — Foley & Lardner LLP

(57) ABSTRACT

A window glass for a vehicle includes a glass plate; and a conductor placed on a surface of the glass plate. The conductor includes a conductive film and a strip electrode for applying a DC voltage to the conductive film. The strip electrode is formed to have a gap between the strip electrode and an outer edge of the conductive film, and is positioned between the outer edge of the conductive film and an outer edge of the glass plate in a plan view of the glass plate. The window glass for the vehicle includes a terminal part for electrically connecting the strip electrode to a transmission line.

16 Claims, 9 Drawing Sheets

(56) References Cited

U.S. PATENT DOCUMENTS

| | | | |
|---|---|---|---|
| 5,610,618 A * | 3/1997 | Adrian | H01Q 1/1271 343/711 |
| 5,719,585 A * | 2/1998 | Tabata | H01Q 1/1271 343/704 |
| 5,739,794 A * | 4/1998 | Nagy | B32B 17/10036 343/711 |
| 6,239,758 B1 * | 5/2001 | Fuchs | H01Q 1/1278 343/704 |
| 6,266,538 B1 * | 7/2001 | Waldron | H01Q 1/084 343/702 |
| 7,289,073 B2 * | 10/2007 | Song | H01Q 1/1271 343/711 |
| 7,564,416 B2 * | 7/2009 | Lindenmeier | H01Q 1/1278 343/713 |
| 7,936,852 B2 * | 5/2011 | Lindenmeier | H04B 7/0814 375/347 |
| 8,115,686 B2 * | 2/2012 | Mumbru | H01Q 5/371 343/700 MS |
| 8,120,543 B2 * | 2/2012 | Sulima | H01Q 13/18 343/702 |
| 8,344,890 B2 * | 1/2013 | Zhu | G06K 19/07749 340/572.8 |
| 8,466,842 B2 * | 6/2013 | Dai | H01Q 13/10 343/712 |
| 8,576,130 B2 * | 11/2013 | Dai | H01Q 1/1278 343/713 |
| 8,941,545 B2 * | 1/2015 | Kagaya | H01Q 13/10 343/713 |
| 9,413,070 B2 * | 8/2016 | Lee | H01Q 13/10 |
| 9,652,979 B2 * | 5/2017 | Camden | G08C 17/02 |
| 9,728,854 B2 * | 8/2017 | Kim | H01Q 1/243 |
| 9,755,684 B2 * | 9/2017 | Yoo | H04B 1/3838 |
| 9,764,533 B2 * | 9/2017 | Boote | B32B 17/10036 |
| 10,149,367 B2 * | 12/2018 | Camden | H01Q 13/10 |
| 10,176,422 B2 * | 1/2019 | Ennabli | H01Q 1/2225 |
| 2002/0015824 A1 * | 2/2002 | Kawamoto | B32B 17/10036 428/156 |
| 2003/0019859 A1 | 1/2003 | Sol | |
| 2003/0150848 A1 | 8/2003 | Noguchi et al. | |
| 2004/0257286 A1 * | 12/2004 | Iijima | H01Q 1/1278 343/713 |
| 2006/0102610 A1 * | 5/2006 | Hoepfner | H05B 3/84 219/203 |
| 2007/0020465 A1 * | 1/2007 | Thiel | B32B 17/10036 428/428 |
| 2007/0164919 A1 * | 7/2007 | Lee | H01Q 1/38 343/770 |
| 2008/0028697 A1 * | 2/2008 | Li | B32B 27/08 52/171.2 |
| 2008/0158851 A1 * | 7/2008 | Cochrane | H05K 9/0073 361/818 |
| 2011/0175791 A1 * | 7/2011 | Ozdemir | H01Q 1/00 343/876 |
| 2012/0086614 A1 * | 4/2012 | Droste | H01Q 1/1278 343/713 |
| 2013/0113664 A1 | 5/2013 | Kobayashi et al. | |
| 2015/0207203 A1 | 7/2015 | Lee et al. | |
| 2016/0006112 A1 * | 1/2016 | Kagaya | H01Q 1/1285 343/712 |
| 2016/0134013 A1 * | 5/2016 | Suenaga | H01Q 1/1271 343/711 |
| 2016/0174420 A1 * | 6/2016 | Cochrane | H05K 9/0009 361/818 |

FOREIGN PATENT DOCUMENTS

| | | |
|---|---|---|
| JP | 2003-176154 A | 6/2003 |
| JP | 2003-211956 A | 7/2003 |
| JP | 2012-023603 A | 2/2012 |
| WO | WO-2014/157535 A1 | 10/2014 |

\* cited by examiner

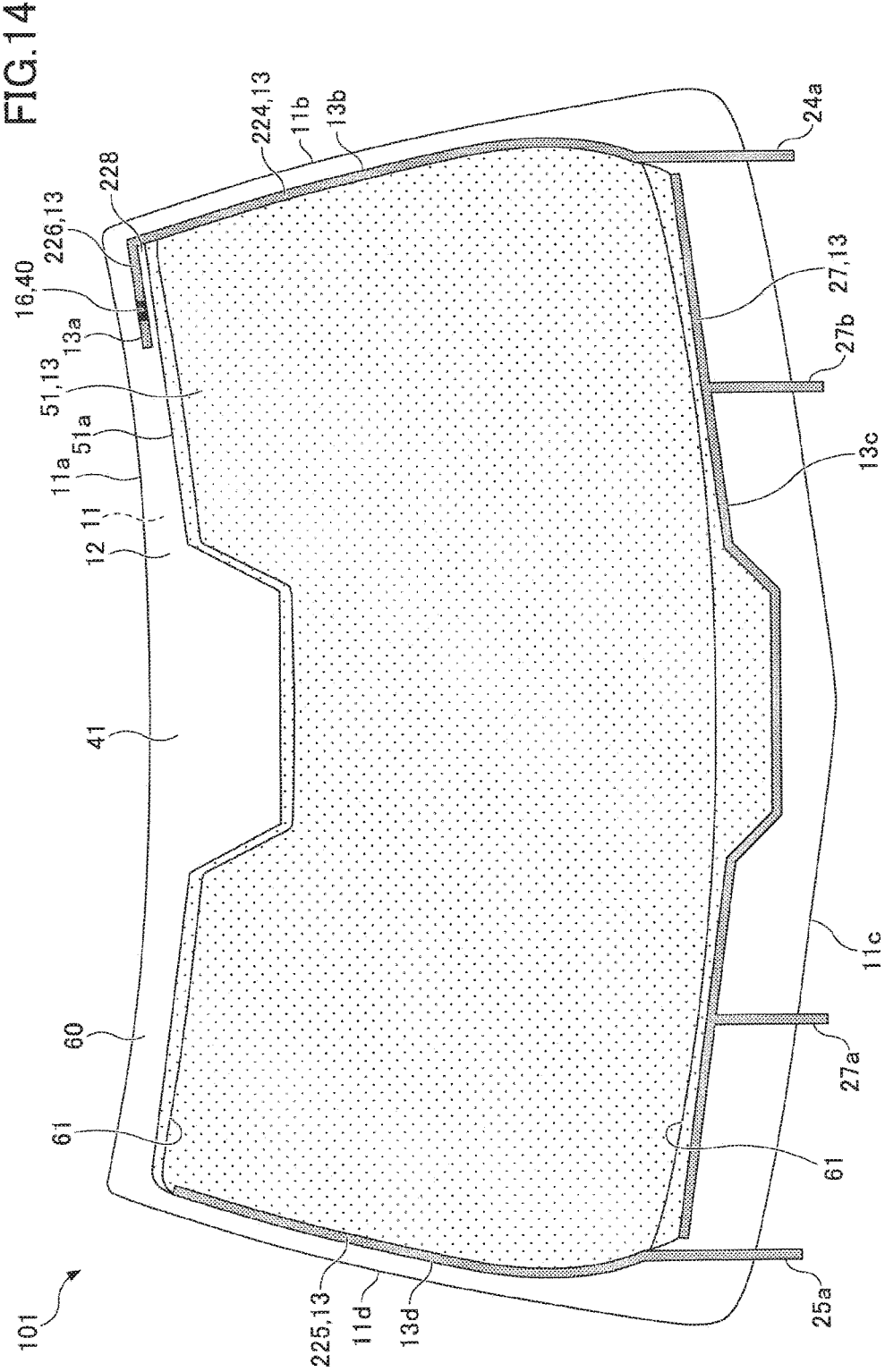

WINDOW GLASS FOR VEHICLE

CROSS-REFERENCE TO RELATED APPLICATION

This application is based upon and claims the benefit of priority of the prior Japanese Priority Application No. 2016-103690 filed on May 24, 2016, the entire contents of which are hereby incorporated by reference.

BACKGROUND OF THE INVENTION

1. Field of the Invention

The present disclosure relates to a window glass for a vehicle.

2. Description of the Related Art

Conventionally, as a window glass for a vehicle including a glass plate and a conductive film, a window glass for a vehicle has been known that has a bus bar disposed between the outer edge of the glass plate and the outer edge of the conductive film, for feeding electric power to the conductive film (see, for example, Patent document 1). Also, as a window glass for a vehicle including a glass plate and a conductive film, a window glass for a vehicle has been known that has an antenna disposed between the outer edge of the glass plate and the outer edge of the conductive film (see, for example, Patent document 2).

PRIOR ART DOCUMENTS

Patent Documents

Patent document 1: Japanese Unexamined Patent Application Publication No. 2003-211956
Patent document 2: Japanese Unexamined Patent Application Publication No. 2012-23603

SUMMARY OF THE INVENTION

As in a window glass for a vehicle disclosed in Patent document 1, space may exist between the outer edge of a strip electrode for applying a DC voltage to the conductive film, and the outer edge of the glass plate. If an antenna is provided in this space, the space may need to be expanded depending on the size of the antenna. However, expanding the space moves the strip electrode inward on the glass plate (i.e., in a direction moving away from the outer edge of the glass plate), and this may narrow the field of view through the window glass for the vehicle due to the blocking strip electrode.

Thereupon, it is an object of an aspect of the present invention to provide a window glass for a vehicle that makes it possible to secure the field of view and to have the functionality of an antenna.

In order to achieve the above object, according to an aspect, a window glass for a vehicle includes a glass plate; and a conductor placed on a surface of the glass plate. The conductor includes a conductive film and a strip electrode for applying a DC voltage to the conductive film. The strip electrode is formed to have a gap between the strip electrode and an outer edge of the conductive film, and is positioned between the outer edge of the conductive film and an outer edge of the glass plate in a plan view of the glass plate. The window glass for the vehicle includes a terminal part for electrically connecting the strip electrode to a transmission line.

According to the aspect, the window glass includes the terminal part for electrically connecting the strip electrode to the transmission line. This makes it possible to use the strip electrode positioned to have the gap toward the outer edges of the conductive film, as an antenna conductor as it is. Therefore, without newly providing an antenna conductor between the outer edge of the strip electrode and the outer edge of the glass plate, the window glass for the vehicle can have the function of an antenna. Also, it is not necessary to expand the space between the outer edge of the strip electrode, and the outer edge of the glass plate. Therefore, the degree by which the field of view through the window glass for the vehicle is blocked by the strip electrode becomes smaller, and the field of view can be secured easily.

BRIEF DESCRIPTION OF THE DRAWINGS

FIG. 14 is a plan view illustrating another example of a configuration of a window glass for a vehicle.

DESCRIPTION OF THE PREFERRED EMBODIMENTS

Figure 1:
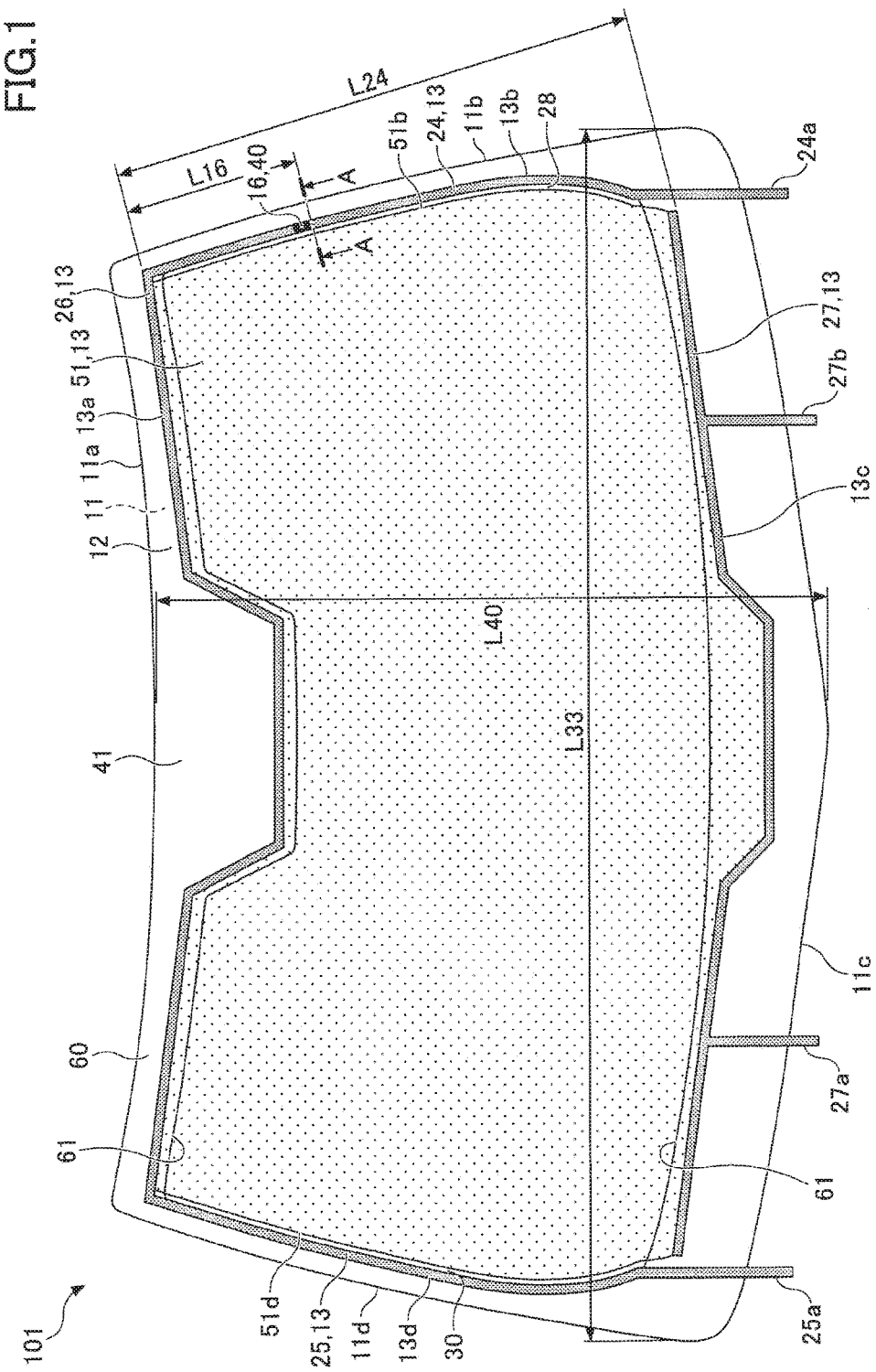
FIG. 1 is a plan view illustrating an example of a configuration of a window glass for a vehicle.

In the following, embodiments of the present invention will be described with reference to the drawings. Note that in the drawings for describing the embodiments, a direction means a direction in a figure unless otherwise specified, and a reference direction in each figure corresponds in a direction having a code or a number attached. Also note that parallel directions, orthogonal directions, and the like may include shifts to an extent that effects of the present invention are not degraded. Also, as a window glass to which the present invention can be applied, for example, a windshield attached to the front part of a vehicle may be considered. Note that an applicable window glass may be a rear glass attached to the rear part of a vehicle, the side glass attached to the side part of a vehicle, the roof glass attached to the ceiling part of a vehicle, or the like.

FIG. 1 is a plan view illustrating an example of a configuration of a window glass 101 for a vehicle. The window glass 101 includes a first glass plate 11, a second glass plate 12, a conductor 13, and a terminal part 40. The window glass 101 is an example of a window glass for a vehicle, specifically, an example of a windshield. FIG. 1 illustrates a state where the first glass plate 11 and the second glass plate 12 overlap with each other, and the conductor 13 is visible transparently through the second glass plate 12.

The first glass plate 11 and the second glass plate 12 are transparent or semi-transparent, plate-shaped dielectrics. The window glass 101 is a laminated glass that has the first glass plate 11 placed on the side outward from the vehicle, and the second glass plate 12 placed on the side inward to the vehicle bonded together via an intermediate film.

Note that the window glass for a vehicle in the embodiment is not limited to such a laminated glass having multiple glass plates bonded together, but may be constituted with a single glass plate, a plate-shaped dielectric, and a conductor placed between the glass plate and the plate-shaped dielectric, or may be constituted with a single glass plate and a conductor placed on the surface of the glass plate.

The conductor 13 is an example of a conductor placed so as to be extended planarly between the first glass plate 11 and the second glass plate 12.

The conductor 13 is disposed, for example, to be stacked on the surface of the first glass plate 11 on the side inward to the vehicle compartment or the surface of the second glass plate 12 on the side outward from the vehicle compartment (principal surface). If the window glass 101 is a laminated glass, the conductor 13 may be placed to be interposed between the first glass plate 11 and the second glass plate 12 forming the laminated glass, or may be placed to be interposed between the intermediate film and one of the glass plates.

The conductor 13 may be formed by coating a conductive material (for example, silver) applied to the surface of a glass plate by sputtering or the like. Alternatively, the conductor 13 may be formed by coating a conductive material applied to the surface of a resin film (for example, polyethylene terephthalate), which is a member separate from the glass plate, by sputtering or the like. Also, as the conductive material, for example, a zinc oxide film (for example, a zinc oxide film containing gallium (GZO film), an ITO (compound oxide of indium and tin), gold, copper, or the like may be used.

Although at least a part of the outer edge of the conductor 13 is offset inward on the first glass plate 11 relative to the glass edges 11a-11d, which are the outer edges of the first glass plate 11, the outer edge may be aligned with the glass edges 11a-11d. The conductor 13 has an upper outer edge 13a, a right outer edge 13b, a lower outer edge 13c, and a left outer edge 13d. The conductor 13 has a concave portion 41 dented along the upper outer edge 13a. Note that the shape of the conductor 13 is not limited to that illustrated in the figure.

The conductor 13 includes an upper bus bar 26, a lower bus bar 27 facing the upper bus bar 26, a right bus bar 24 connected to the right-end part of the upper bus bar 26, a left bus bar 25 connected to the left-end part of the upper bus bar 26, and a conductive film 51. The upper bus bar 26, the lower bus bar 27, the right bus bar 24, and the left bus bar 25 are examples of strip electrodes, respectively, for applying a DC voltage to the conductive film 51.

The upper bus bar 26 is an example of an upper strip electrode disposed along the upper outer edge 13a of the conductor 13. The upper bus bar 26 extends along the upper outer edge 13a, and electrically contacts the upper outer edge of the conductive film 51.

The lower bus bar 27 is an example of a lower strip electrode disposed along the lower outer edge 13c of the conductor 13. The lower bus bar 27 extends along the lower outer edge 13c, and electrically contacts the lower outer edge of the conductive film 51.

The right bus bar 24 is an example of a right strip electrode having a gap 28 between itself and a right outer edge 51b of the conductive film 51, and positioned between the right outer edge 51b of the conductive film 51 and a right outer edge 11b of the first glass plate 11, in a plan view of the first glass plate 11. The right outer edge 11b is one of the side outer edges of the first glass plate 11. The right bus bar 24 is a first side strip electrode that has the gap 28 along the right outer edge 51b being one of the side outer edges of the conductive film 51, and extends in a vertical direction. The right bus bar 24 does not electrically contact the lower right corner (a right terminal part of the lower bus bar 27) of the conductive film 51, but electrically contacts the upper right corner (a right terminal part of the upper bus bar 26) of the conductive film 51.

The left bus bar 25 is an example of a left strip electrode having a gap 30 between itself and a left outer edge 51d of the conductive film 51, and positioned between the left outer edge 51d of the conductive film 51 and a left outer edge 11d of the first glass plate 11, in a plan view of the first glass plate 11. The left outer edge 11d is another side outer edge of the first glass plate 11. The left bus bar 25 is a second side strip electrode that has the gap 30 along the left outer edge 51d being the other side outer edge of the conductive film 51, and extends in a vertical direction. The left bus bar 25 does not electrically contact the lower left corner (a left terminal part of the lower bus bar 27) of the conductive film 51, but electrically contacts the upper left corner (a left terminal part of the upper bus bar 26) of the conductive film 51.

Note that the plan view of the first glass plate 11 represents a plan view from the viewpoint for illustrating FIG. 1, and is synonymous with the plan view of the window glass 101.

The conductive film 51 is a transparent or semi-transparent conductive film. The conductive film 51 is a conductor in which a current flows when a DC voltage is applied between the pair of the bus bars 26 and 27 to heat the window glass 101 so as to be capable of melting snow, melting ice, defogging, and the like on the window glass 101. The applications of the conductive film 51 are not limited as such.

In order to apply the DC voltage between the pair of the bus bars 26 and 27 for causing the current to flow in the conductive film 51, the negative potential side of the DC voltage is connected to the right bus bar 24 and the left bus bar 25 that are electrically connected to the upper bus bar 26, and the higher potential side of the DC voltage is connected to the lower bus bar 27. This makes it possible to apply the DC voltage to the conductive film 51.

For example, in a state where the window glass 101 is installed in a vehicle, an in-vehicle power supply part is electrically connected to the lower bus bar 27, and a ground part on the vehicle is electrically connected to the right bus bar 24 and the left bus bar 25. The power supply part is, for example, the positive electrode of a DC power supply such as a battery, and the ground part is, for example, the negative electrode of the DC power supply such as a battery, or a body frame (body ground).

On the contrary, in order to apply DC voltage to the conductive film 51, the higher potential side of the DC voltage may be connected to the right bus bar 24 and the left bus bar 25, and the low potential side of the DC voltage may be connected to the lower bus bar 27. For example, the power supply part is electrically connected to the right bus bar 24 and the left bus bar 25, and the ground part is electrically connected to the lower bus bar 27.

The electric connection structure between the bus bars and the power supply part or the ground part is not limited particularly. For example, if each bus bar is stacked in the laminated glass, the bus bar is electrically connected to the power supply part or the ground part via an electrode extension part such as a copper foil pulled out from the outer edge part of the laminated glass. Alternatively, the power supply part or the ground part may be electrically connected to each bus bar exposed on the surface of the laminated glass.

FIG. 1 illustrates examples of electrode extension parts 24a, 25a, 27a, and 27b. The electrode extension part 24a is a conductor extending from the lower end part of the right bus bar 24. The electrode extension part 25a is a conductor extending from the lower end part of the left bus bar 25. The electrode extension part 27a is a conductor extending from the left part of the lower bus bar 27. The electrode extension part 27b is a conductor extending from the right part of the lower bus bar 27.

The window glass 101 may include a masking film 60 to mask a part or all of the outer edge part of the conductor 13. The masking film 60 is placed between the conductor 13 and the first glass plate 11. This makes it difficult for a part of the window glass 101 overlapping the masking film 60 to be seen from the outside of the vehicle in a plan view, and improves the designability of the window glass 101. The masking film 60 is, for example, ceramics formed on the surface of the first glass plate 11. As an example of the masking film 60a, a baked black ceramic film or the like may be considered.

The masking film 60 is formed between masking edges 61 and the glass edges 11a-11d in the plan view of the window glass 101. The masking edges 61 are the film edges of the masking film 60. In the case of FIG. 1, the masking film 60 masks the upper bus bar 26, the lower bus bar 27, and the upper edge and the lower edge of the conductive film 51.

The window glass 101 includes a terminal part 40 to electrically connect the right bus bar 24 to a transmission line. The terminal part 40 can extract a high-frequency current excited in the right bus bar 24, and can output the extracted current to the transmission line. Providing the terminal part 40 as such makes it possible to use the right bus bar 24, which is positioned to have the gap 28 between itself and the right outer edges 51b of the conductive film 51, as an antenna conductor as it is. Therefore, it is possible to give the function of an antenna to the window glass 101 without newly providing an antenna conductor between the right outer edge 13b of the conductor 13 and the right outer edge 11b of the first glass plate 11. Further, it is not necessary to expand the space between the right outer edge 13b of the conductor 13 and the right outer edge 11b of the first glass plate 11. Therefore, the degree by which the field of view of a passenger through the window glass 101 is blocked by the right bus bar 24 becomes smaller, and the field of view can be secured easily. Moreover, it is possible to avoid a reduced area of the conductive film 51 due to expanding the space, and can secure the area of the conductive film 51 easily. Therefore, it is possible to easily secure the area on which the conductive film 51 can heat the window glass 101.

Similarly, the window glass 101 may include a terminal part 40 to electrically connect the left bus bar 25 to a transmission line. This makes it possible to use the left bus bar 25, which is positioned to have the gap 30 between itself and the left outer edges 51d of the conductive film 51, as an antenna conductor as it is. Therefore, similar to the case of the right bus bar 24, the field of view of a passenger through the window glass 101 and the area of the conductive film 51 can be easily secured.

Using both the right bus bar 24 and the left bus bar 25 as antenna conductors makes it is possible, for example, to use an antenna constituted with the right bus bar 24 and the left bus bar 25 as a multiband antenna, a diversity antenna, or a MIMO (Multi-Input Multi-Output) antenna.

Examples of the transmission line electrically connected to the terminal part 40 include a coaxial cable, a microstrip line, a strip line, a coplanar waveguide with a ground plane (a coplanar waveguide having a ground plane placed on the surface opposite to the conductive surface where signal wires are formed), and a coplanar strip line. One end of the transmission line is connected to the terminal part 40, and the other end of the transmission line is connected to a receiver.

In FIG. 1, although the terminal part 40 is positioned above the central part of the right bus bar 24 in a vertical direction, the position is not limited as such. The terminal part 40 just needs to be placed in the neighborhood of the right bus bar 24, taking the length of the transmission line connected to the terminal part 40, the installed position of the receiver, and the like into consideration.

In the embodiment, L16 is 230 mm and L24 is 690 mm. L16 represents the direct distance from the upper-end part of the right bus bar 24 to the terminal part 40, and L24 represents the direct distance from the upper-end part of the right bus bar 24 to the extended line of the lower bus bar 27. The upper-end part of the right bus bar 24 almost overlaps the upper flange end of the window frame of the vehicle to which the window glass 101 is attached, and the extended line of the lower bus bar 27 almost overlaps the lower flange end of the window frame.

Also, it is preferable that the negative potential side of the DC voltage (for example, a ground part) is connected to the right bus bar 24 and the left bus bar 25. This makes it possible to prevent a high-frequency noise generated in the power supply part from propagating to the right bus bar 24 and the left bus bar 25 functioning as the antenna conductors.

Further, since the terminal part 40 electrically connects the transmission line to the right bus bar 24 and the left bus bar 25 extending in the vertical direction, it is advantageous to receiving a vertically polarized radio wave.

In the case of FIG. 1, the terminal part 40 has a planar electrode 16 (simply referred to as an "electrode 16", below) that faces the right bus bar 24, having the second glass plate 12 interposed between the electrode 16 and the right bus bar 24. The transmission line is electrically connected to the electrode 16. Since the electrode 16 faces the right bus bar 24 having the second glass plate 12 (a dielectric) interposed between the electrode 16 and the right bus bar 24, the electrode 16 forms a capacitive coupling (an electrostatic coupling) with the right bus bar 24. Therefore, the transmission line electrically connected to the electrode 16 is electrically connected to the right bus bar 24 by the electrostatic coupling.

The electric power is fed via the electrode 16 to the right bus bar 24 functioning as the antenna conductor. The right bus bar 24 functions as a monopole antenna having the electrode 16 as an electrode, which is a unipolar type antenna. This is the same for the left bus bar 25. The signal wire of the transmission line such as a coaxial cable is electrically connected to the electrode 16, and the ground line of the transmission line such as a coaxial cable is electrically connected to the body frame (a ground part).

In FIG. 1, the forms (shapes, size, etc.) of the bus bars and the electrodes just need to be set to satisfy the required value of the antenna gain required for receiving a radio wave in a frequency band to be received by the bus bars. For example, if the frequency band to be received by the bus bars is the digital terrestrial television broadcasting band of 470-770 MHz, the bus bars and the like are formed to be suitable for receiving radio waves in the digital terrestrial television broadcasting band of 470-770 MHz.

If a coaxial cable is used as a power feeder (a transmission line) for feeding electric power to the bus bar via the electrode 16, for example, the internal conductor of the coaxial cable is electrically connected to the electrode 16, and the external conductor of the coaxial cable is electrically connected to the body frame (a ground part). Also, a configuration may be adopted in which a connector is mounted on the electrode 16 for electrically connecting the electrode 16 to the transmission line such as a coaxial cable. Such a connector makes it easier to attach the signal wire of the transmission line to the electrode 16. Further, the electrode 16 may be configured to have a conductive member having a projecting shape (an example of the transmission line) is provided on the electrode 16 so that the conductive member having the projecting shape contacts and fits in the electric supply part disposed on the flange part of the body to which the window glass is attached.

The shape of the electrode 16 is determined in consideration of the shape of the conductive member or the mounting surface of the connector and the like. For example, a polygon or a rectangular shape, such as a square, an approximate square, a rectangle, and an approximate rectangle are preferable in terms of packaging. Note that a circular shape, such as a circle, an approximate circle, an ellipse, and an approximate ellipse may be adopted.

Also, the electrode 16 is formed of, for example, a paste containing a conductive metal such as a silver paste, which is printed on the surface of the second glass plate 12 on the side inward to the vehicle, and baked. However, the method of forming is not limited as such, but a string-shaped object or a foil-shaped object made of a conductive substance such as copper may be formed on the surface of the second glass plate 12 on the side inward to the vehicle, or bonded to the surface of the second glass plate 12 by an adhesive or the like.

Figure 2:
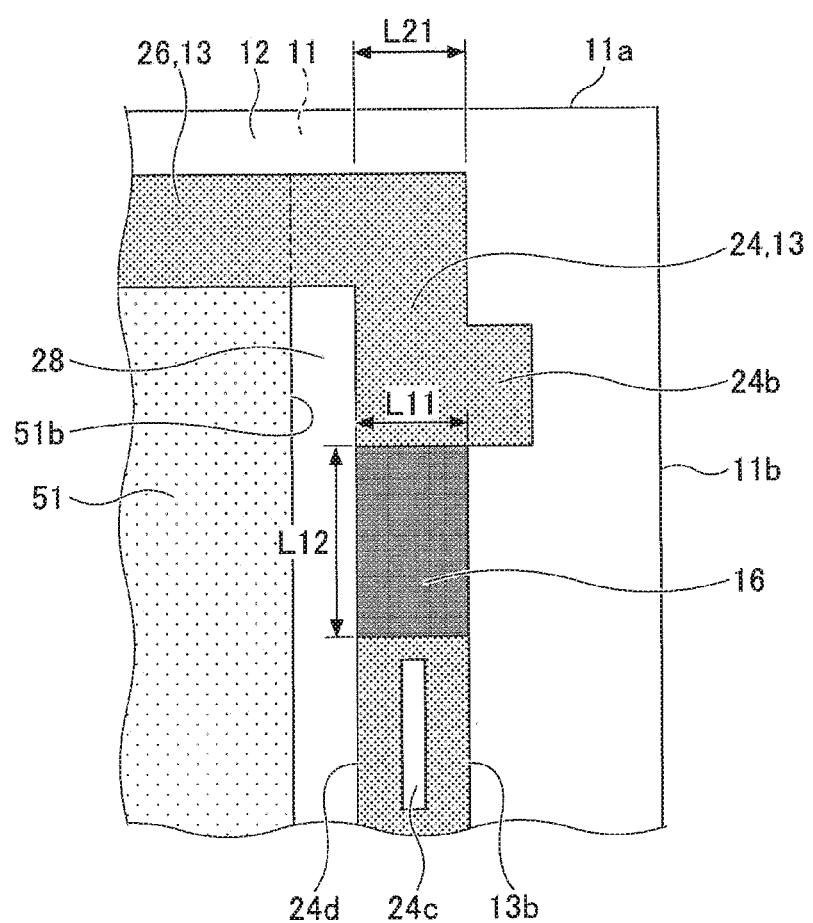
FIG. 2 is a plan view partially illustrating an example of a configuration of a window glass for a vehicle.

FIG. 2 is a plan view partially illustrating an example of a configuration of the window glass 101. FIG. 2 illustrates an expanded view of the right bus bar 24. The following description is applicable to the left bus bar 25.

The right bus bar 24 may have a slot 24c, which is a cutout without having an open end in the conductor part of the right bus bar 24, and may have a widened part 24b, which is a part of the right bus bar 24 whose width in the lateral direction of the right bus bar 24 is increased toward the right outer edge 11b of the first glass plate 11. Providing the slot 24c or the widened part 24b makes it possible to adjust the resonance frequency of the right bus bar 24 functioning as an antenna conductor.

It is preferable that the electrode 16 does not overlap the conductive film 51 in the plan view of the first glass plate 11. If the electrode 16 overlaps the conductive film 51 in the plan view of the first glass plate 11, the electrostatic coupling between the electrode 16 and the conductive film 51 becomes stronger, whereas the electrostatic coupling of the electrode 16 and the right bus bar 24 becomes weaker. Consequently, the antenna gain of the right bus bar 24 functioning as an antenna conductor may drop. Therefore, by placing the electrode 16 so as not to overlap the conductive film 51 in the plan view of the first glass plate 11, it is possible to prevent the antenna gain from dropping. Note that if the drop of the antenna gain is allowed within a permissible range, just a part of the electrode 16 may overlap the conductive film 51 in the plan view of the first glass plate 11.

It is preferable that the area where the electrode 16 overlaps the right bus bar 24 in the plan view of the first glass plate 11 (referred to as the "area S", below) is contained within a range not protruding out of the outer edge of the first glass plate 11 (for example, the upper limit of the area S is 10000 mm$^2$ or less), and is greater than or equal to 25 mm$^2$, and more preferably, greater than or equal to 200 mm$^2$. It is furthermore preferable that the area S is greater than or equal to 300 mm$^2$ as long as it is within the range. Even if the area S is less than 25 mm$^2$ or less than 200 mm$^2$, a sufficient antenna gain may be obtained in the frequency band of the digital terrestrial television broadcasting depending on the shape of the right bus bar 24. On the other hand, the area S greater than or equal to 200 mm$^2$ or more preferably greater than or equal to 300 mm$^2$ improves not only the antenna gain in the frequency band of the digital terrestrial television broadcasting, but also the antenna gain in the frequency band of band III (band 3) of Digital Audio Broadcasting (DAB). The frequency band of the digital terrestrial television broadcasting is 470-770 MHz. The frequency band of the band 3 is 174-240 MHz.

It is preferable that the electrostatic capacitance C between the electrode 16 and the right bus bar 24 is greater than or equal to 1 pF and less than or equal to 300 pF, or more preferably, greater than or equal to 6 pF and less than or equal to 80 pF. Even if the electrostatic capacitance C is less than 1 pF or less than 6 pF, a sufficient antenna gain may be obtained in the frequency band of the digital terrestrial television broadcasting depending on the shape of the right bus bar 24. On the other hand, the electrostatic capacitances C greater than or equal to 6 pF or more preferably greater than or equal to 9 pF improves not only the antenna gain in the frequency band of the digital terrestrial television broadcasting, but also the antenna gain in the frequency band of the band 3.

Note that the electrostatic capacitance C is represented by $$C=\varepsilon_0 \times \varepsilon_r \times S/d$$

where $\varepsilon_0$ represents the permittivity of a vacuum ($\approx 8.85 \times 10^{-12}$ F/m); $\varepsilon_r$ represents the relative permittivity of the second glass plate 12 (a dielectric); d represents the plate thickness of the second glass plate 12 (a dielectric); and S represents the area where the electrode 16 overlaps the right bus bar 24 in the plan view of the first glass plate 11.

If $\varepsilon_r$ is 7.0, d is 2 mm, and the area S is 25 mm$^2$, 200 mm$^2$, 300 mm$^2$, 2500 mm$^2$, or 10000 mm$^2$, then, the electrostatic capacitance C is about 1 pF, about 6 pF, about 9 pF, about 80 pF, or about 300 pF, respectively.

It is preferable that the entire electrode 16 overlaps the right bus bar 24 in the plan view of the first glass plate 11 as illustrated in the figure. This makes the area S larger than in a case where a part of the electrode 16 overlaps the right bus bar 24, and hence, the antenna gain of the right bus bar 24 functioning as an antenna conductor improves more. Also, since the electrode 16 does not protrude out of the right bus bar 24 to be seen in the plan view, the appearance also improves.

Figure 3:
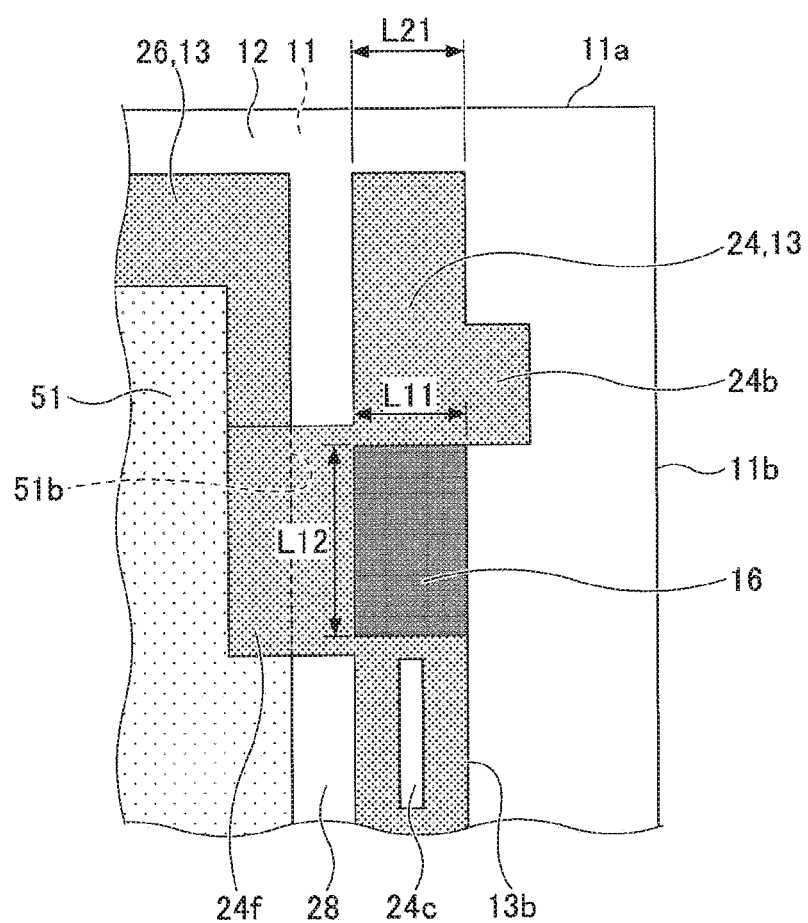
FIG. 3 is a plan view partially illustrating another example of a configuration of a window glass for a vehicle.

FIG. 3 is a plan view partially illustrating another example of a configuration of the window glass 101. As illustrated in FIG. 3, the upper bus bar 26 may be connected to an intermediate part 24f of the right bus bar 24 instead of being connected to the upper-end part of the right bus bar 24. The intermediate part 24f protrudes toward the conductive film 51 over the gap 28. The intermediate part 24f protrudes, for example, in the lateral direction from a part facing the electrode 16 of the right bus bar 24.

Figure 4:
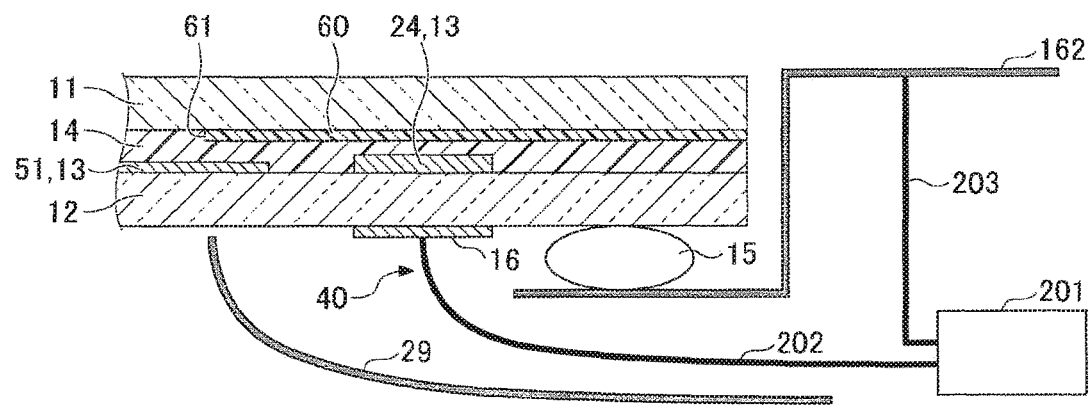
FIG. 4 is a cross-sectional view partially illustrating an example of a configuration of a window glass for a vehicle.
Figure 5:
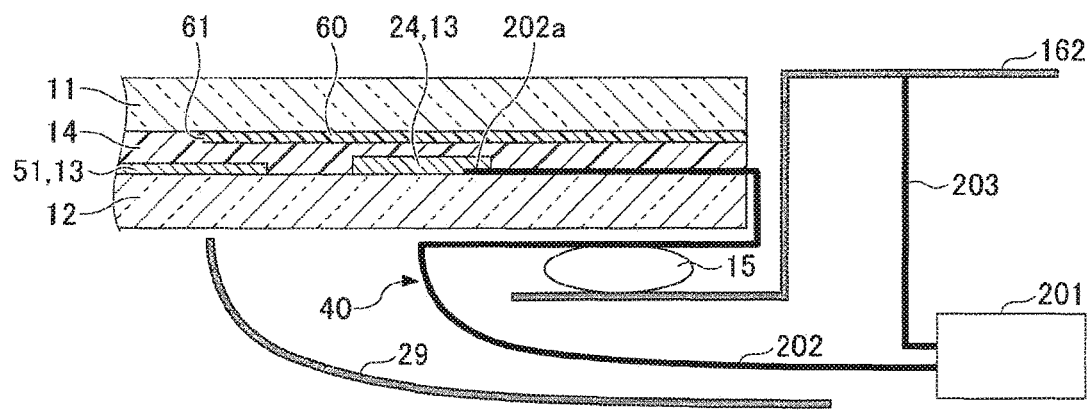
FIG. 5 is a cross-sectional view partially illustrating another example of a configuration of a window glass for a vehicle.
Figure 6:
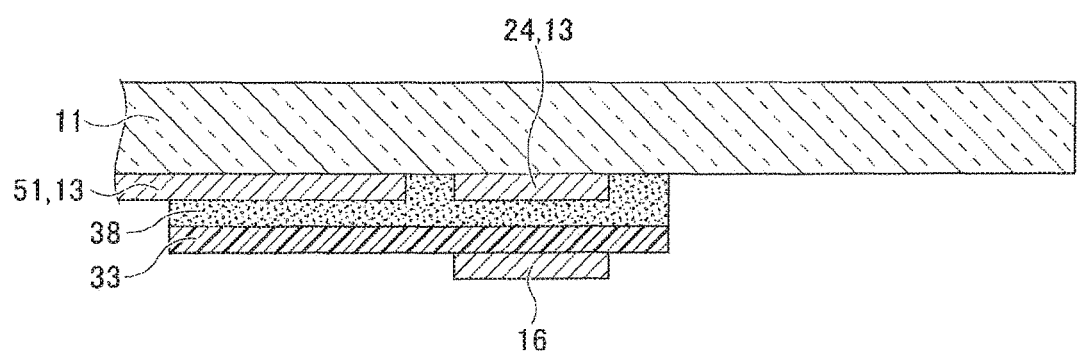
FIG. 6 is a cross-sectional view partially illustrating another example of a configuration of a window glass for a vehicle.

FIGS. 4-6 illustrate variations of forms of stacking layers included in the window glass according to the embodiment has. FIGS. 4-6 are cross-sectional views in a cross section A-A designated in FIG. 1. In FIGS. 4-6, the conductor 13 (the conductive film 51 and right bus bar 24) is placed between the first glass plate 11 and the dielectric (the second glass plate 12 or a dielectric substrate 33).

In the case of FIG. 4 and FIG. 5, the conductor 13 and an intermediate film 14 are placed between the first glass plate 11 and the second glass plate 12. The first glass plate 11 and the second glass plate 12 are joined by the intermediate film 14. The intermediate film 14 is made of, for example, thermoplastic polyvinyl butyral. The relative permittivity $\varepsilon_r$ of the intermediate film 14 is greater than or equal to 2.8 and less than or equal to 3.0, which is the relative permittivity of a common intermediate film of a laminated glass, for example.

In FIG. 4, the electrode 16 is formed by printing on a surface of the second glass plate 12 on the side inward to the vehicle (a surface on the side opposite to the first glass plate 11). The conductor 13 is coated on a surface of the second glass plate 12 on the side of the first glass plate 11 by vapor deposition. The electrode 16 faces the right bus bar 24 having the second glass plate 12 being the dielectric interposed in-between. This forms a capacitive coupling between the electrode 16 and the right bus bar 24, and hence, the electrode 16 is electrically connected to the right bus bar 24.

The capacitive coupling between the electrode 16 and the right bus bar 24 of the conductor 13 filters noise in the frequency band where the capacitive coupling is not formed. Therefore, it is possible to control the noise in the conductor 13. This is the same for another form of stacking layers (FIG. 6) as will be described later.

In FIG. 4, the terminal part 40 has the electrode 16 and a connector 201. An end of the transmission line such as a coaxial cable is connected to the connector 201. Connecting the end of the transmission line to the connector 201 makes the signal wire of the transmission line connected to the electrode 16 via a signal lead 202, and the ground line of the transmission line is connected to a body flange 162 via a ground lead 203. The body flange 162 is a part of the body frame (a ground part). The connector 201 may have a configuration to be mountable on the electrode 16. The second glass plate 12 and the body flange 162 are bonded by a seal 15. The electrode 16 is covered by an interior panel 29 to improve the appearance.

In FIG. 5, a part of the signal lead 202 is enclosed between the first glass plate 11 and the second glass plate 12. The right bus bar 24 is connected to an end 202a of the signal lead 202, and via the signal lead 202, connected to the connector 201 outside of the window glass 101.

As illustrated in FIG. 6, the window glass for a vehicle according to the embodiment may not be a laminated glass. In this case, the dielectric does not need to have the same size as the first glass plate 11, and may be a dielectric substrate or the like having a size on which the electrode 16 can be formed. In the case of FIG. 6, the conductor 13 is placed between the first glass plate 11 and the dielectric substrate 33.

The dielectric substrate 33 is, for example, a substrate made of resin. The electrode 16 is disposed on the dielectric substrate 33. The dielectric substrate 33 may be a printed circuit board made of resin having the electrode 16 printed (for example, a glass epoxy board of FR4 to which a copper foil is attached).

FIG. 6 illustrates a form in which the first glass plate 11 has the conductor 13 coated by vapor deposition, on the surface of the first glass plate 11 on the side facing the dielectric substrate 33. The conductor 13, the first glass plate 11, and the dielectric substrate 33 are bonded by an adhesion layer 38.

First Application Example

Figure 7:
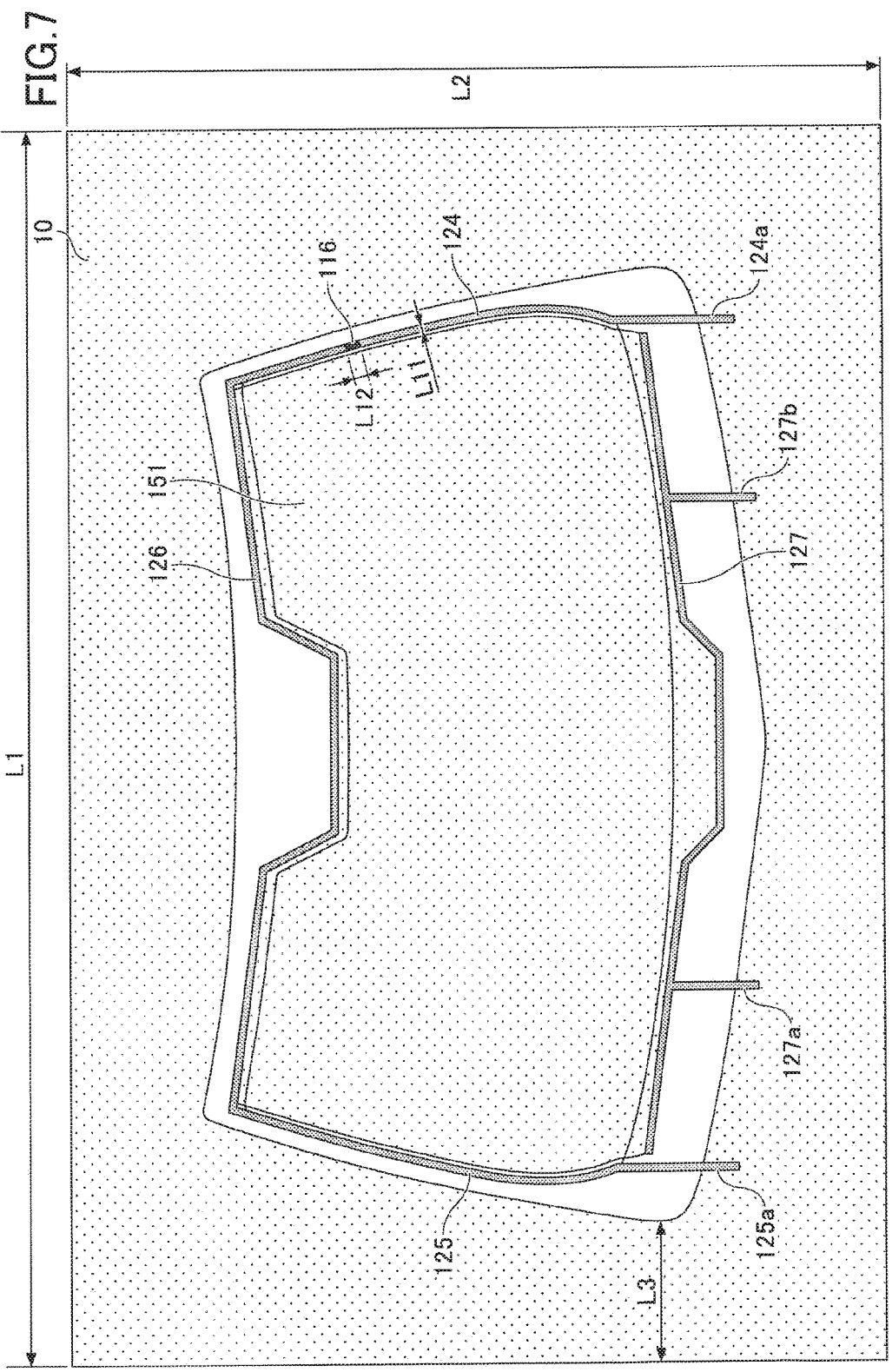
FIG. 7 is a diagram illustrating an example of a model of a window glass for a vehicle on a computer.

FIG. 7 is a diagram illustrating an example of a model of the window glass 101 on a computer. A model body 10 represents a perfect conductor that models the body of a vehicle to which the window glass 101 is attached. A model conductive film 151 is a perfect conductor that models the conductive film 51. Model bus bars 124-127 are perfect conductors that model the right bus bar 24, the left bus bar 25, the upper bus bar 26, and the lower bus bar 27, respectively. Model electrode extension parts 124a, 125a, 127a, and 127b are perfect conductors that model the electrode extension parts 24a, 25a, 27a, and 27b, respectively. The model electrode extension parts 124a, 125a, 127a, and 127b are connected to the model body 10. Therefore, the model conductive film 151, the model bus bars 124-127, and the model electrode extension parts 124a, 125a, 127a, and 127b are at the same potential as the model body 10. A model electrode 116 is a perfect conductor that models the electrode 16. The form of stacked layers is the same as in FIG. 4.

In FIG. 7, relevant dimensions are assumed as follows by the unit of mm:
L1: 1950;
L2: 1300;
L3: 226; and
L11 (breadth of the electrode): 10. Also, the breadth of the bus bar shall is also assumed be 10 mm, which is equivalent to L11. Further, the following dimensions are assumed:
The thickness of the glass plate: 2.0 mm;
The relative permittivity of the glass plate: 7.0
The thickness of the intermediate film per sheet: 0.76 mm (30 mil);
The sheet resistance of the conductive film: 1.0 Ω;
The thickness of the conductive film: 0.01 mm;
The thickness of the electrode: 0.01 mm.

For the window glass having the numerical values set as such, the average of the antenna gain is calculated for every 10 Hz in a range of 170-240 MHz being the frequency band of the band 3 by an electromagnetic field simulation based on an FDTD method (Finite-Difference Time-Domain method). In the simulation, the antenna gain is calculated in a state where the entire model of FIG. 7 is tilted 25° with respect to the horizontal plane as in the case of an actual windshield.

Figure 8:
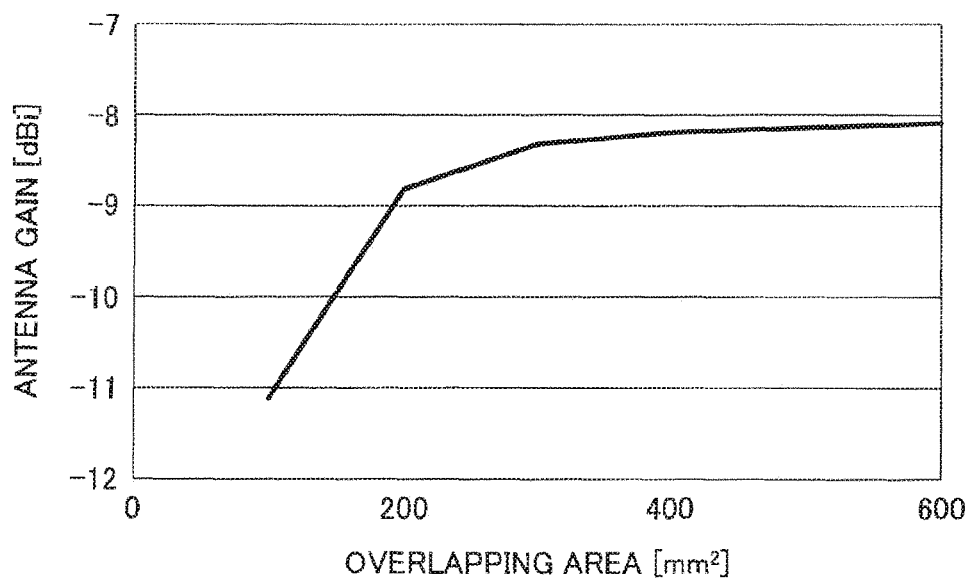
FIG. 8 is a diagram illustrating an example of a simulation result of a relationship between the area where an electrode electrically connected to a transmission line overlaps a strip electrode, and the antenna gain.

FIG. 8 illustrates a simulation result of a relationship between the antenna gain and the area S where the model electrode 116 overlaps the model bus bar 124, when the vertical length L12 of the model electrode 116 is changed from 10 mm to 60 mm. The vertical axis represents the average of the antenna gain measured for every 10 Hz in 170-240 MHz being the frequency band of the band 3. As illustrated in FIG. 8, the antenna gain in the frequency band of the band 3 improves if the area S is greater than or equal to 200 mm$^2$ (corresponding to the electrostatic capacitance C of 6 pF), or more preferably, greater than or equal to 300 mm$^2$ (corresponding to the electrostatic capacitance C of 9 pF).

Second Application Example

FIGS. 9-13 illustrate actual measurement results of the antenna gain and the reflective coefficient S11 of the bus bar functioning as an antenna conductor, in a state where the window glass 101 is attached to the front window frame of an actual vehicle. The form of stacked layers is the same as in FIG. 4. The conductor 13 is modeled by a copper foil stuck on the window glass 101.

The reflective coefficient and antenna gain are actually measured in a state where the window glass 101 is attached to the window frame of a vehicle on a turntable, and has the part corresponding to the electrode 16 tilted by about 25° with respect to the horizontal plane. A connector is attached to the electrode 16 to be connected to the internal conductor of a coaxial cable, and the electrode 16 is connected to a network analyzer via the coaxial cable. The turntable is rotated so that the window glass receives in every direction a radio wave horizontally emitted.

The antenna gain is measured by setting the center of the vehicle having the window glass 101 attached at the center of the turntable, and rotating the turntable by 360°. Data of the antenna gain is measured for each rotational angle incremented by 1°, and for every 1.12 MHz in a frequency range of 100-230 MHz, or for every 2.27 MHz in a frequency range of 230-900 MHz.

The elevation angle between the antenna and the position at which the radio wave is emitted is assumed to be in a virtually horizontal direction (i.e., assuming that an elevation angle equal to 0° corresponds to a plane parallel to the ground, and an elevation angle equal to 90° corresponds to the direction toward the zenith, the direction here corresponds to the elevation angle equal to 0°). The measurement of the antenna gain is normalized with respect to a perfect nondirectional antenna as the reference where the antenna gain of the perfect nondirectional antenna is set to 0 dBi.

Figure 9:
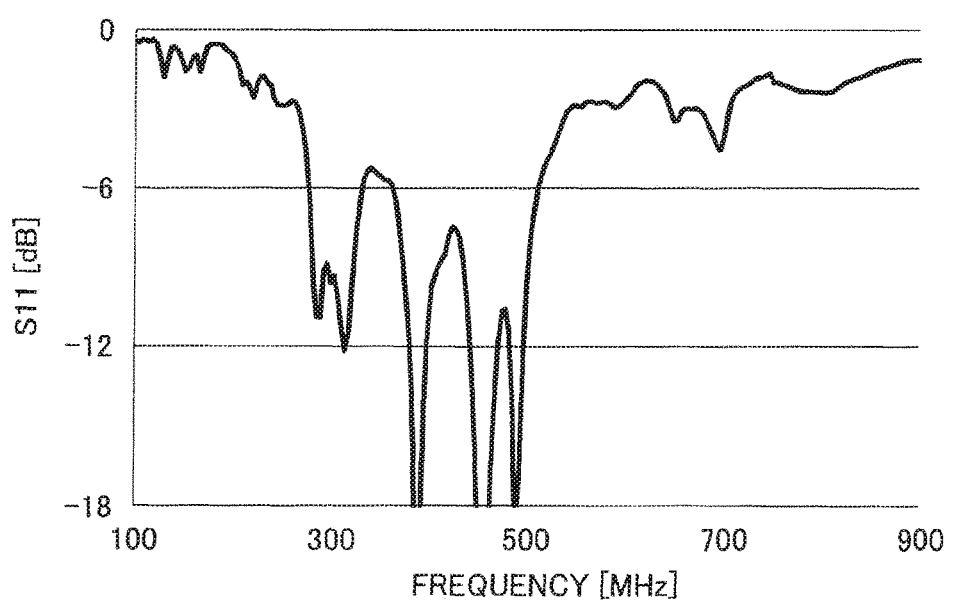
FIG. 9 is a diagram illustrating an example of an actual measurement result of S11 when the area of an electrode electrically connected to a transmission line is small.

FIG. 9 is a diagram illustrating an example of an actual measurement result of S11 when the area S where the electrode 16 overlaps the right bus bar 24 is 200 mm$^2$. As illustrated in FIG. 9, matching is obtained in the frequency band of the digital terrestrial television broadcasting.

Figure 10:
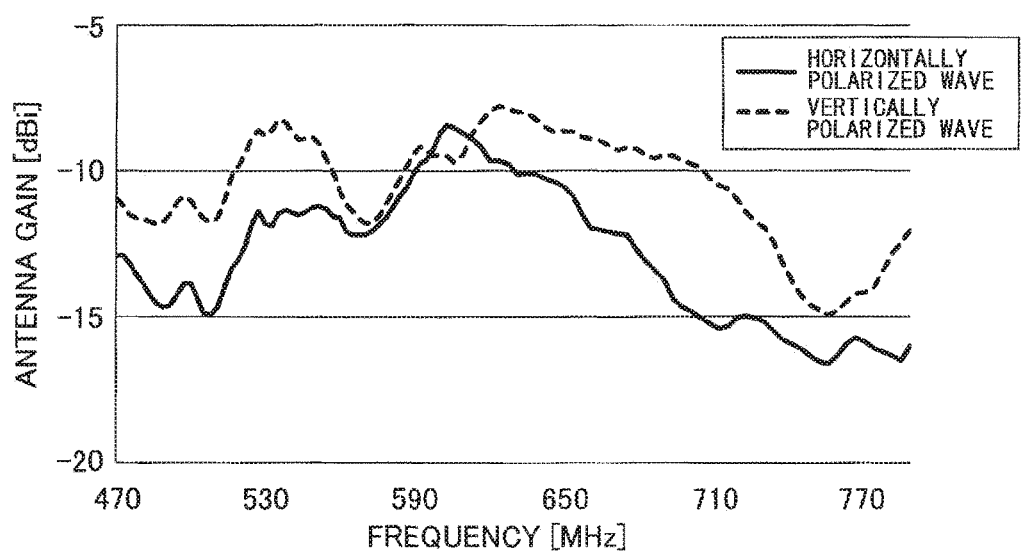
FIG. 10 is a diagram illustrating an example of an actual measurement result of the antenna gain when an electrode electrically connected to a transmission line is small.

FIG. 10 is a diagram illustrating an example of an actual measurement result of the antenna gain when the area S where the electrode 16 overlaps the right bus bar 24 is 200 mm$^2$. As illustrated in FIG. 10, a sufficient antenna gain is obtained in the frequency band of the digital terrestrial television broadcasting. In particular, a higher characteristic is obtained for the antenna gain for a vertically polarized wave than for the antenna gain for a horizontally polarized, in the entire frequency band on average.

Note that for the measurement results in FIG. 9 and FIG. 10, relevant dimensions are assumed as follows by the unit of mm:
L16 (see FIG. 1): 230:
L24 (see FIG. 1): 690;
L33 (see FIG. 1): 1491;
L40 (see FIG. 1): 825;
L11 (see FIG. 2): 10;
L12 (see FIG. 2): 20;
L21 (see FIG. 2): 12; and
The breadth of the gap 28 (see FIG. 2): 1. The widened part 24b and the slot 24c (see FIG. 2) are not provided. L33 represents the maximum outside dimension of the window glass in the horizontal direction. L40 represents the outside dimension of the central part of the window glass in the vertical direction. L21 represents the breadth of the bus bar.

Figure 11:
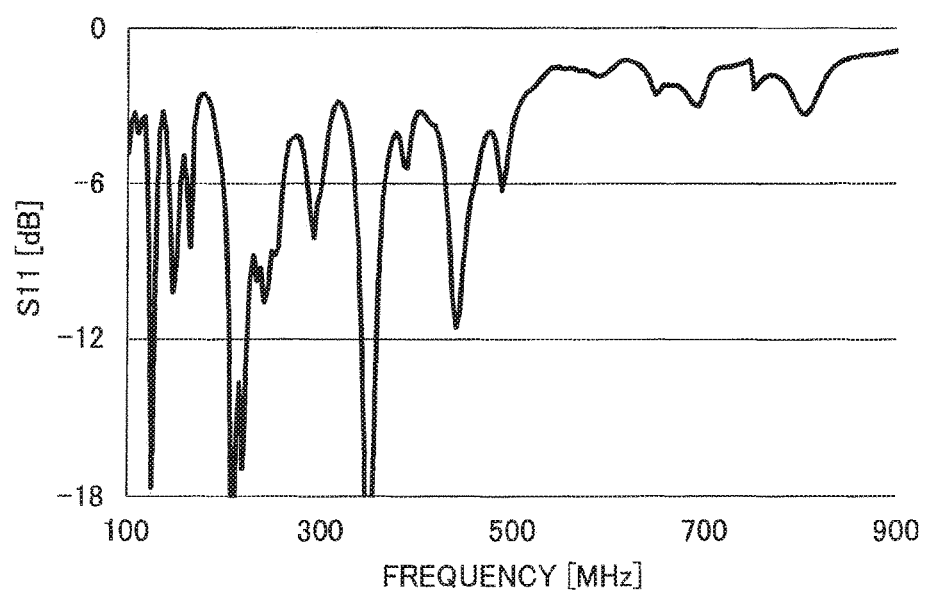
FIG. 11 is a diagram illustrating an example of an actual measurement result of S11 when the area of an electrode electrically connected to a transmission line is large.

FIG. 11 is a diagram illustrating an example of an actual measurement result of S11 when the area S where the electrode 16 overlaps the right bus bar 24 is 600 mm$^2$. As illustrated in FIG. 11, matching is obtained not only in the frequency band of the digital terrestrial television broadcasting, but also in the frequency band of the band 3.

Figure 12:
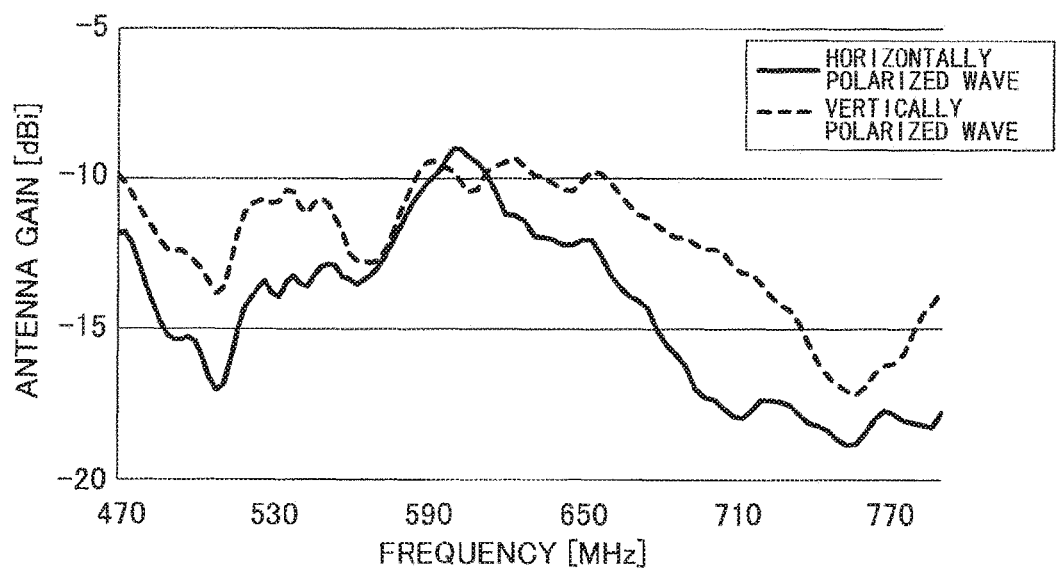
FIG. 12 is a diagram illustrating an example of an actual measurement result of the antenna gain when an electrode electrically connected to a transmission line is large.

FIG. 12 is a diagram illustrating an example of an actual measurement result of the antenna gain when the area S where the electrode 16 overlaps the right bus bar 24 is 600 mm$^2$. As illustrated in FIG. 12, a sufficient antenna gain is obtained in the frequency band of the digital terrestrial television broadcasting. In particular, a higher characteristic is obtained for the antenna gain for a vertically polarized wave than for the antenna gain for a horizontally polarized, in the entire frequency band on average.

Figure 13:
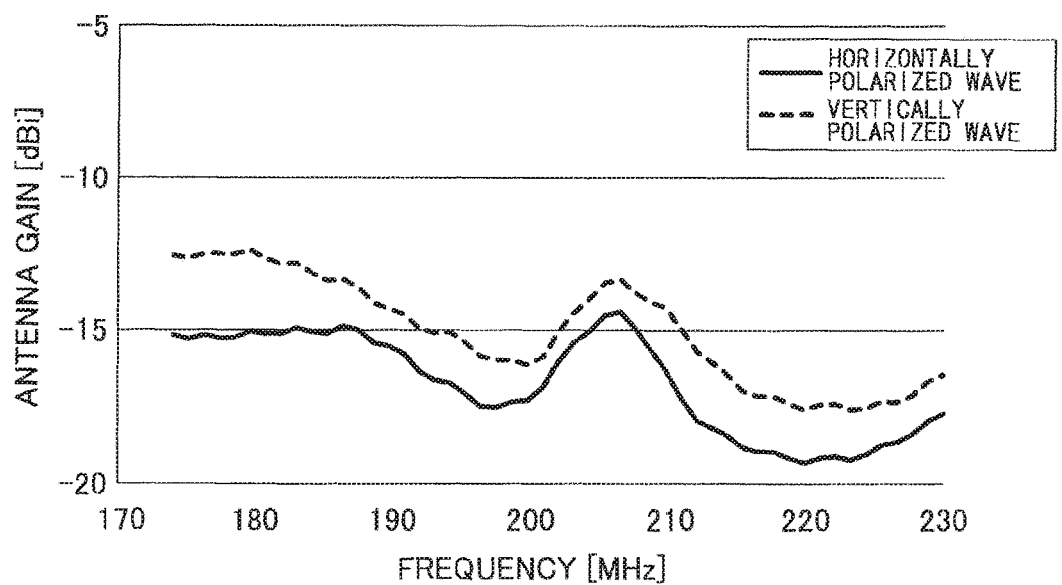
FIG. 13 is a diagram illustrating an example of an actual measurement result of the antenna gain when an electrode electrically connected to a transmission line is large.

FIG. 13 is a diagram illustrating an example of an actual measurement result of the antenna gain when the area S where the electrode 16 overlaps the right bus bar 24 is 600 mm$^2$. As illustrated in FIG. 13, a sufficient antenna gain is obtained in the frequency band of the band 3. In particular, a higher characteristic is obtained for the antenna gain for a vertically polarized wave than for the antenna gain for a horizontally polarized, in the entire frequency band on average.

Note that for the measurement results in FIG. 11 to FIG. 13, relevant dimensions in the unit of mm are the same as in FIG. 9 and FIG. 10 except for L12 (see FIG. 2) being 60.

So far, the window glass and the antenna for a vehicle have been described with the embodiments. Note that the present invention is not limited to the above embodiments. Various modifications and improvements can be made within the scope of the present invention, by combining and/or replacing a part of or all of an embodiment with the others.

For example, the bus bars may be provided on all four outer edges of the conductor at the top, bottom, right, and left, may be provided only on two outer edges the conductor at the right and left, or may be provided only in the two outer edges of the conductor at the top and bottom. Also, the bus bar may be provided on only three outer edges of the conductor at the top, right, and left, or may be provided on only three outer edges of the conductor at the bottom, right, and left.

For example, in FIG. 1, the terminal part 40 may be positioned at the central part of the right bus bar 24 or the left bus bar 25 in the vertical direction, or may be positioned lower than the central part.

For example, in FIG. 2, although the slot 24c and the widened part 24b are provided in the neighborhood of the electrode 16, they may be provided away from the electrode 16. The widened part 24b may be widened inward to the first glass plate 11 (for example, in the case of FIG. 2, toward the side opposite to the right outer edge 11b).

For example, the present invention is applicable not only to a form in which the vertical bus bar (the right bus bar or the left bus bar) is electrically connected to the transmission line via the terminal part, but also to a form in which a horizontal bus bar (the upper bus bar or the lower bus bar) is electrically connected to the transmission line via the terminal part. For example, in FIG. 1, it is possible to have the upper bus bar 26 connected to the transmission line function as an antenna conductor by providing a gap between the upper bus bar 26 and the upper edge of the conductive film 51. Alternatively, it is possible to have the lower bus bar 27 connected to the transmission line function as an antenna conductor by providing a gap between the lower bus bar 27 and the upper edge of the conductive film 51. Note that even if a gap is provided between the upper bus bar 26 or the lower bus bar 27 and the conductive film 51, a voltage can be applied to the conductive film 51, naturally.

FIG. 14 illustrates a modified example of the form illustrated in FIG. 1, to illustrate an example of a form including the terminal part 40 for electrically connecting the upper bus bar 226 to the transmission line. Although the gap 28 exists between the right bus bar 24 and the right outer edge 51b of the conductive film 51, and the gap 30 exists between the left bus bar 25 and 51d of the left outer edges of the conductive film 51 in FIG. 1, no gap 28 or 30 exists in FIG. 14. In FIG. 14, a gap 228 exists between an upper bus bar 226 and an upper outer edge 51a of the conductive film 51.

In FIG. 14, the right bus bar 224 electrically contacts the right outer edge of the conductive film 51, the left bus bar 225 electrically contacts the left outer edge of the conductive film 51, and the lower bus bar 27 electrically contacts the lower outer edge of the conductive film 51.

The upper bus bar 226 is an example of an upper strip electrode that has the gap 228 between itself and the upper outer edges 51a of the conductive film 51, and is positioned between the upper outer edge 51a of the conductive film 51, and the upper outer edge 11a of the first glass plate 11 in the plan view of the first glass plate 11. The upper outer edge 11a is one of the outer edges of the first glass plate 11 on the upside. The upper bus bar 226 extends in the lateral direction, having the gap 228 along the upper outer edge 51a, which is the upper outer edge of the conductive film 51. One end of the upper bus bar 226 electrically contacts the upper terminal part of the right bus bar 224. The terminal part 40 is as described above.

The invention claimed is:

1. A window glass for a vehicle, comprising:
a glass plate; and
a conductor placed on a surface of the glass plate,
wherein the conductor includes a conductive film and a strip electrode configured to apply a DC voltage to the conductive film to flow a current for heating the conductive film,
wherein the strip electrode includes
a first part contacting the conductive film,
a second part defining a gap between the strip electrode and a portion of an outer edge of the conductive film,
an upper bus bar disposed along an upper outer edge of the conductor,
a lower bus bar disposed along a lower outer edge of the conductor,
a right bus bar that does not contact a right terminal part of the lower bus bar, and
a left bus bar that does not contact a left terminal part of the lower bus bar,
wherein a negative potential side of the DC voltage is connected to the right bus bar and the left bus bar that are electrically connected to the upper bus bar, and a higher potential side of the DC voltage is connected to the lower bus bar,
wherein the strip electrode is positioned between the outer edge of the conductive film and an outer edge of the glass plate in a plan view of the glass plate,
wherein the portion of the outer edge of the conductive film does not contact the strip electrode,
wherein the strip electrode is configured as an antenna conductor, and
wherein the window glass for the vehicle includes:
a terminal part configured to directly connect the second part of the strip electrode to a transmission line, or
a dielectric component and a terminal part comprising a planar electrode facing the second part of the strip electrode, wherein the dielectric component is interposed between the terminal part and the second part, and the terminal part is capacitively coupled to the second part of the strip electrode to electrically connect the second part of the strip electrode to the transmission line.

2. The window glass for the vehicle as claimed in claim 1, wherein the window glass for the vehicle includes the dielectric component and the terminal part comprising the planar electrode, and the planar electrode does not overlap the conductive film in the plan view of the glass plate.

3. The window glass for the vehicle as claimed in claim 1, wherein the window glass for the vehicle includes the dielectric component and the terminal part comprising the planar electrode, and an entirety of the planar electrode overlaps the strip electrode in the plan view of the glass plate.

4. The window glass for the vehicle as claimed in claim 1, wherein the window glass for the vehicle includes the dielectric component and the terminal part comprising the planar electrode, and an area where the planar electrode overlaps the strip electrode in the plan view of the glass plate is greater than or equal to 25 mm$^2$, and the area is contained within a range not protruding out of the outer edge of the glass plate.

5. The window glass as claimed in claim 1, wherein the window glass for the vehicle includes the dielectric component and the terminal part comprising the planar electrode, and an electrostatic capacitance between the planar electrode and the strip electrode is greater than or equal to 1 pF and less than or equal to 300 pF.

6. The window glass for the vehicle as claimed in claim 1, wherein the strip electrode is positioned between a side outer edge of the conductive film and a side outer edge of the glass plate in the plan view of the glass plate.

7. The window glass for the vehicle as claimed in claim 1, wherein the strip electrode is an electrode connected to the negative potential side of the DC voltage.

8. The window glass for the vehicle as claimed in claim 1, wherein the right bus bar is positioned to define the gap, the left bus bar is positioned to define another gap between the strip electrode and the outer edge of the conductive film, and both the right bus bar and the left bus bar are configured as antenna conductors.

9. The window glass for the vehicle as claimed in claim 1, wherein the second part has a slot, which is a cutout in a conductor part without having an open end.

10. The window glass for the vehicle as claimed in claim 1, wherein the second part has a widened part where a width of the second part is increased outwardly or inwardly.

11. The window glass for the vehicle as claimed in claim 1, wherein the dielectric is the glass plate.

12. The window glass for the vehicle as claimed in claim 1, wherein the dielectric comprises a substrate made of resin.

13. The window glass for the vehicle as claimed in claim 1, further comprising:
a masking film to mask a part or all of an outer edge part of the conductor.

14. The window glass for the vehicle as claimed in claim 1, wherein the window glass for the vehicle is a laminated glass.

15. The window glass for the vehicle as claimed in claim 1, wherein the window glass for the vehicle is a windshield.

16. A window glass for a vehicle, comprising:
a glass plate; and
a conductor placed on a surface of the glass plate,
wherein the conductor includes a conductive film and a strip electrode configured to apply a DC voltage to the conductive film,
wherein the strip electrode is formed to have a gap between the strip electrode and an outer edge of the conductive film, and is positioned between the outer edge of the conductive film and an outer edge of the glass plate in a plan view of the glass plate,
wherein the window glass for the vehicle includes a terminal part for electrically connecting the strip electrode to a transmission line,
wherein the terminal part includes a planar electrode facing the strip electrode, having a dielectric interposed between the terminal part and the strip electrode, and
wherein only a part of the planar electrode overlaps the conductive film in the plan view of the glass plate.

* * * * *